US009951875B2

(12) United States Patent
Marocchini et al.

(10) Patent No.: US 9,951,875 B2
(45) Date of Patent: Apr. 24, 2018

(54) BUTTERFLY VALVE WITH STRUT

(75) Inventors: Francis P. Marocchini, Somers, CT (US); Scott L. Lothian, Enfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 13/430,115

(22) Filed: Mar. 26, 2012

(65) Prior Publication Data

US 2013/0248747 A1    Sep. 26, 2013

(51) Int. Cl.
*F16K 1/22* (2006.01)
*F16K 31/16* (2006.01)
*F16K 27/02* (2006.01)
*F16K 31/163* (2006.01)

(52) U.S. Cl.
CPC .......... *F16K 1/221* (2013.01); *F16K 27/0218* (2013.01); *F16K 31/1635* (2013.01)

(58) Field of Classification Search
USPC ......... 251/14, 291, 292, 305, 306, 307, 308, 251/366, 367
See application file for complete search history.

(56) References Cited

U.S. PATENT DOCUMENTS

| | | | | |
|---|---|---|---|---|
| 2,910,266 A | * | 10/1959 | Condello | 251/25 |
| 3,420,500 A | * | 1/1969 | Geiselman | 251/288 |
| 3,420,550 A | | 1/1969 | Geiselman | |
| 3,857,545 A | * | 12/1974 | Santi | 251/229 |
| 4,082,246 A | * | 4/1978 | Rothwell | 251/307 |
| 4,770,392 A | * | 9/1988 | Schmidt | 251/158 |
| 4,961,538 A | * | 10/1990 | Hewitt | 239/728 |
| 5,582,200 A | * | 12/1996 | Kimpel et al. | 137/375 |
| 6,213,141 B1 | * | 4/2001 | Eggleston | 137/15.25 |
| 6,530,557 B1 | * | 3/2003 | Guzorek | 251/129.12 |
| 7,231,932 B2 | * | 6/2007 | Schmidt et al. | 137/15.17 |
| 2008/0237527 A1 | * | 10/2008 | Vasquez et al. | 251/366 |

FOREIGN PATENT DOCUMENTS

| | | |
|---|---|---|
| CN | 103216669 A | 7/2013 |
| CN | 101952625 A | 5/2014 |

OTHER PUBLICATIONS

First Office Action; Chinese Patent Office; Patent Application No. 201310099029.5; dated Dec. 15, 2014, 8 pages.

* cited by examiner

*Primary Examiner* — Jessica Cahill
*Assistant Examiner* — Daphne M Barry
(74) *Attorney, Agent, or Firm* — Cantor Colburn LLLP

(57) ABSTRACT

A valve assembly includes a valve body having a valve body central axis. A valve actuator is operably connected to the valve body and is located such that a central axis of the valve actuator is nonparallel to the valve body central axis. A strut extends from the valve body to the valve actuator to support the valve actuator in a fixed relationship to the valve body. A pneumatically-actuated butterfly valve includes a valve body having a valve body central axis and a valve disc. A pneumatic actuator is located such that its central axis is nonparallel to the valve body central axis. The actuator includes a piston disposed in a cylinder, the piston operably connected to the valve disc. A strut extends from the valve body to support the actuator in a fixed relationship to the valve body.

15 Claims, 2 Drawing Sheets

BUTTERFLY VALVE WITH STRUT

BACKGROUND OF THE INVENTION

The subject matter disclosed herein relates to valves. More specifically, the subject matter disclosed herein relates to butterfly valves with pneumatic actuation.

A typical butterfly valve is controlled by a pneumatic actuator. The actuator includes a piston positioned in a cylinder. The piston is connected to a linkage assembly that converts linear motion of the piston in the cylinder to rotary motion of the shaft. The shaft is, in turn connected to a butterfly disc located in a valve body or other flow structure. Rotation of the shaft, via the linkage assembly, rotates the butterfly disc in the valve body, thus opening or closing the valve.

In a typical butterfly valve, the valve body is connected to an actuator body of the pneumatic actuator, with an actuator central axis and a valve body central axis arranged coplanar and in some instances parallel to each other. In such configurations, the actuator is, in effect, cantilevered off the valve body. As such, the actuator is susceptible to vibrations during operation. The actuator can exhibit vibration amplitudes high enough to result in binding of, damage to, or failure of the linkage system and, in turn, failure of the butterfly valve.

BRIEF DESCRIPTION OF THE INVENTION

In one embodiment, a butterfly valve includes a valve body having a valve body central axis. A valve actuator is operably connected to the valve body. The valve actuator is located such that a central axis of the valve actuator is nonparallel to the valve body central axis. A strut extends from the valve body to the actuator housing to support the valve actuator in a fixed relationship to the valve body.

In another embodiment, a pneumatically-actuated butterfly valve includes a valve body having a valve body central axis and a valve disc rotatably located in the valve body. A pneumatic actuator is located such that a central axis of the pneumatic actuator is nonparallel to the valve body central axis. The actuator includes a piston disposed in a cylinder, the piston operably connected to the valve disc. A strut extends from the valve body to the actuator housing to support the actuator in a fixed relationship to the valve body.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 2:
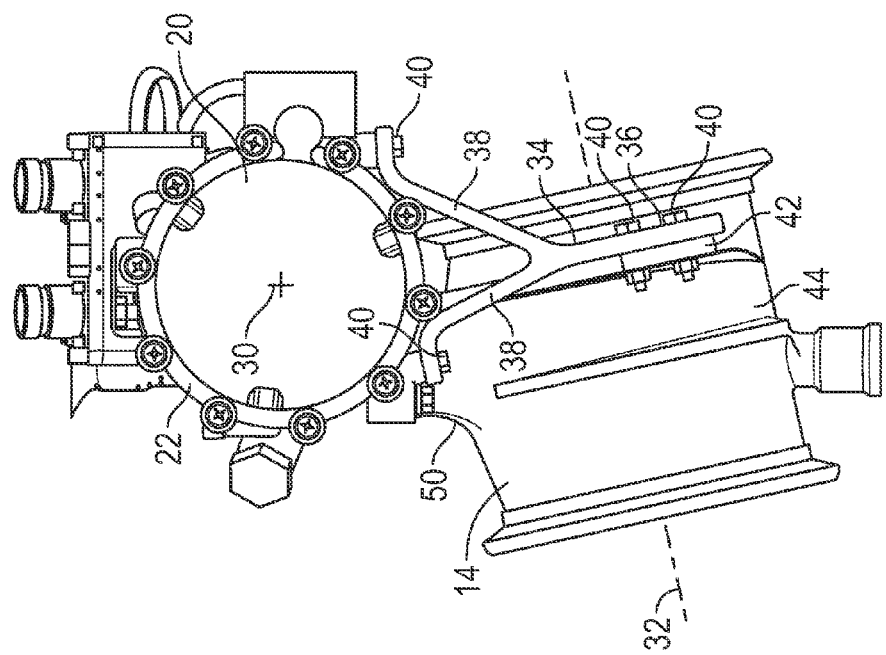
FIG. 2 is a perspective view of an embodiment of a pneumatically actuated butterfly valve system.

The detailed description explains embodiments of the invention, together with advantages and features, by way of example with reference to the drawing.

DETAILED DESCRIPTION OF THE INVENTION

Figure 1:
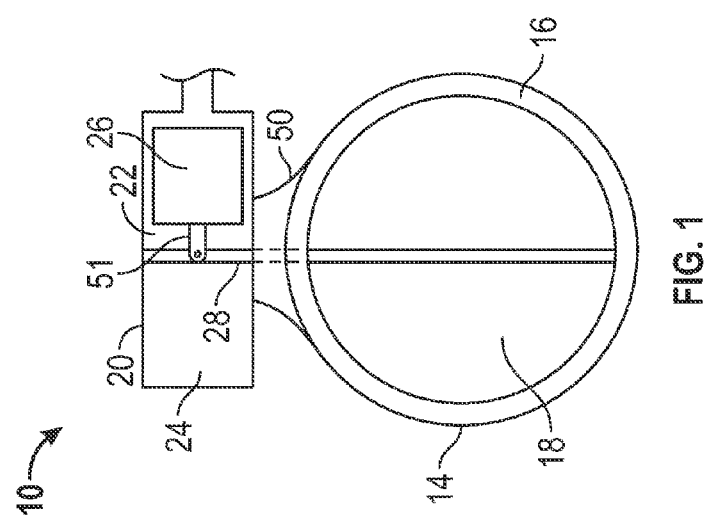
FIG. 1 is a cross-sectional view of an embodiment of a pneumatically actuated butterfly valve system.

Shown in FIG. 1 is an embodiment of a pneumatically-operated butterfly valve 10, such as those utilized to regulate airflow for pneumatically controlled devices (not shown). A valve body 14 extends across a flow path 16 with a valve disc 18 rotatably positioned in the valve body 14 such that rotation of the valve disc 18 decreases or increases flow allowable through the flow path 16. The valve disc 18 is connected to a pneumatic actuator 20 which drives rotation of the valve disc 18. The actuator 20 includes an actuator housing 22 having a cylinder 24 therein, and a piston 26 slidably positioned in the cylinder 24. The piston 26 is connected to the valve disc 18 by a shaft 28 via a linkage assembly 51 to translate sliding motion of the piston 26 in the cylinder 24, in response to changes in pneumatic pressure in the cylinder 24, into rotary motion of the valve disc 18.

Figure 4:
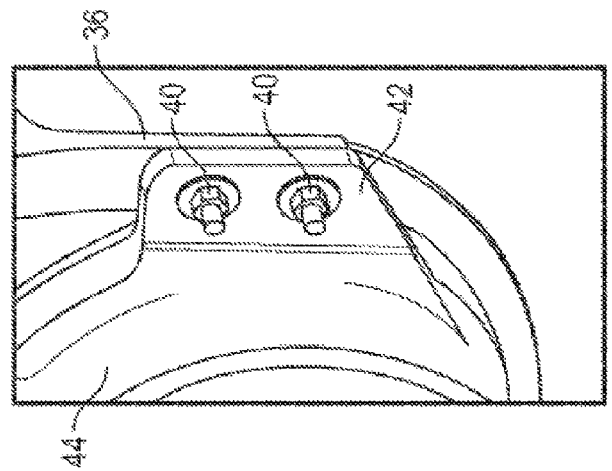
FIG. 4 is another perspective view of the strut attachment to the valve body.
Figure 3:
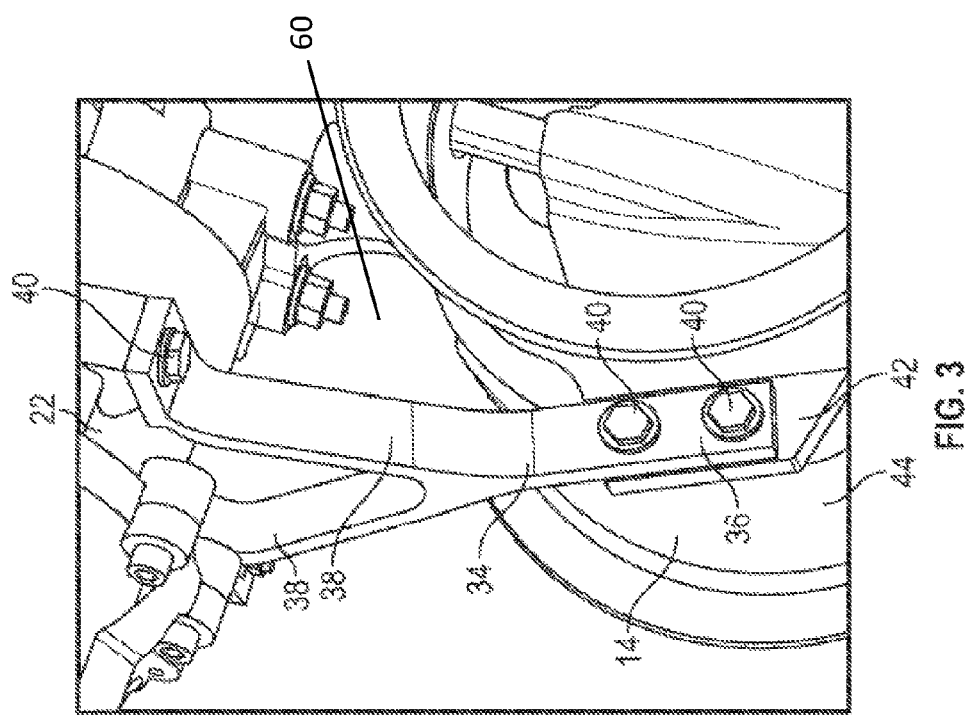
FIG. 3 is a perspective view of a strut extending from a valve body to an actuator housing of a butterfly valve system.

Referring now to FIGS. 2-4, the actuator 20 is secured to the valve body 14 to increase the natural frequency of the actuator 20 thereby reducing the susceptibility of the actuator 20 to vibration and displacement causing malfunctioning of and/or damage to the linkage system 51. Referring to FIG. 2, the actuator 20 is positioned relative to the valve body 14 such that a central actuator axis 30 is nonparallel to a central valve body axis 32. In some embodiments, as shown in FIG. 2, the central actuator axis 30 is substantially perpendicular (at a ninety degree angle) to the central valve body axis 32. It is to be appreciated that the axes 30 and 32 may be arranged at other angles such that the axes 30 and 32 are nonparallel, for example, forty-five degrees or sixty degrees.

In addition to being secured at the attachment boss 50, to provide support for the actuator 20 and prevent vibratory movement, an actuator support strut 34 extends between the valve body 14 and the actuator housing 22 to connect the two components. While one support strut 34 is shown in FIG. 2, it is to be appreciated that two or more support struts 34 may also be utilized. In the embodiment of FIG. 2, the support strut 34 is Y-shaped, with a base 36 secured to the valve body 14 and two arms 38 (FIG. 3) extending from the base 36 and secured to the actuator housing 22. In some embodiments, the arms 38 (FIG. 3) are secured to the actuator housing 22 at tangency points between the arms 38 (FIG. 3) and actuator housing 22 to increase an amount of support provided. The arms 38 (FIG. 3) are secured to the actuator housing 22 by bolts 40, or alternatively by other suitable means.

Referring now to FIGS. 3 and 4, the base 36 of the support strut 34 is secured to the valve body 14 via, for example, bolts 40. As shown, in one embodiment, the valve body 14 and the base 36 are connected with two bolts 40. Utilizing two bolts 40 to secure the base 36 to the valve body 14 enhances resistance to moments and rocking motion caused by operation of the actuator 20. In some embodiments, the base 36 is secured to a valve body flange 42 extending radially outwardly from an outer surface 44 of the valve body 14. The valve body 14, the actuator 20 and the support strut 34 are configured and arranged to define a strut opening 60 between the valve body 14, the actuator 20 and the support strut 34.

Rotating the actuator 20 (FIG. 2) relative to the valve body 14 (as shown at least in FIG. 2), and securing the valve body 14 to the actuator housing 22 via support strut 34 has been shown to increase the natural frequency of the assembly twofold. The increased natural frequency results in lower amplification of vibratory input and reduced displacement of the actuator 20 (FIG. 2) relative to the valve body 14. Reduced relative displacement results in lower stress on components of the butterfly valve 10 (FIG. 1) and improves reliability and service life thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve assembly comprising:
   a valve body having a valve body central axis;
   a valve actuator disposed in an actuator housing and operably connected to the valve body, the valve actuator located such that a central axis of the valve actuator is nonparallel to a the valve body central axis; and
   a strut extending from the valve body to the actuator housing and secured to each of the valve body and the actuator housing to support the valve actuator in a fixed relationship to the valve body, the strut including:
      a base secured to the valve body at a valve body flange extending radially outwardly from the valve body, the valve body flange located off-axis relative to a valve shaft of the valve body; and
      two arms extending from the base and secured to the actuator housing;
      wherein the two arms are arranged non-symmetrically about the base;
   wherein the valve body, the valve actuator and the strut are configured and arranged to define a strut opening between the valve body, the valve actuator and the strut.

2. The valve assembly of claim 1, wherein the valve actuator central axis is at a ninety degree angle relative to the valve body central axis.

3. The valve assembly of claim 1, wherein the strut is Y-shaped.

4. The valve assembly of claim 1, wherein each arm is secured to the actuator housing.

5. The valve assembly of claim 4, wherein each arm is secured to the actuator housing at a tangency point to the actuator housing.

6. The valve assembly of claim 1, wherein the strut is secured to the valve body via two or more bolts.

7. The valve assembly of claim 1, wherein the actuator is a pneumatic actuator.

8. The valve assembly of claim 1, wherein a first arm of the two arms has a longer length than a second arm of the two arms.

9. A pneumatically-actuated butterfly valve comprising:
   a valve body having a valve body central axis;
   a valve disc rotatably disposed in the valve body and connected to a valve shaft;
   a pneumatic actuator disposed in an actuator housing and located such that a central axis of the pneumatic actuator is nonparallel to the valve body central axis, the actuator including a piston disposed in a cylinder, the piston operably connected to the valve disc; and
   a strut extending from the valve body to the actuator housing and secured to each of the valve body and the actuator housing to support the actuator in a fixed relationship to the valve body, the strut including:
      a base secured to the valve body at a valve body flange extending radially outwardly from the valve body, the valve body flange located off-axis relative to the valve shaft; and
      two arms extending from the base and secured to the actuator housing;
      wherein the two arms are arranged non-symmetrically about the base;
   wherein the valve body, the valve actuator and the strut are configured and arranged define a strut opening between the valve body, the valve actuator and the strut.

10. The valve of claim 9, wherein the actuator central axis is at a ninety degree angle relative to the valve body central axis.

11. The valve of claim 9, wherein the strut is Y-shaped.

12. The valve of claim 9, wherein each arm is secured to the actuator housing.

13. The valve of claim 12, wherein each arm is secured to the actuator at a tangency point to the actuator housing.

14. The valve of claim 9, wherein the strut is secured to the valve body via two or more bolts.

15. A valve assembly comprising:
   a valve body having a valve body central axis;
   a valve actuator disposed in an actuator housing and operably connected to the valve body, the valve actuator located such that a central axis of the valve actuator is nonparallel to a the valve body central axis; and
   a strut extending from the valve body to the actuator housing and secured to each of the valve body and the actuator housing to support the valve actuator in a fixed relationship to the valve body, the strut including:
      a base secured to the valve body at a valve body flange extending radially outwardly from the valve body, the valve body flange located off-axis relative to a valve shaft of the valve body; and
      two arms extending from the base and secured to the actuator housing;
   wherein the two arms are arranged non-symmetrically about the base;
   wherein the valve body, the valve actuator and the strut are configured and arranged to define a strut opening between the valve body, the valve actuator and the strut;
   wherein the strut is secured to the valve body via a mechanical fastener; and
   wherein each arm of the strut is secured to the actuator housing by a mechanical fastener.

* * * * *